(12) United States Patent
Rong et al.

(10) Patent No.: US 12,106,892 B2
(45) Date of Patent: Oct. 1, 2024

(54) METHOD FOR THREE-DIMENSIONAL PRINTING OF MAGNETIC MATERIALS

(71) Applicant: Ford Global Technologies, LLC, Dearborn, MI (US)

(72) Inventors: Chuanbing Rong, Canton, MI (US); Feng Liang, Troy, MI (US); Leyi Zhu, Novi, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 706 days.

(21) Appl. No.: 17/329,741

(22) Filed: May 25, 2021

(65) Prior Publication Data
US 2021/0280368 A1    Sep. 9, 2021

Related U.S. Application Data

(62) Division of application No. 15/730,163, filed on Oct. 11, 2017, now Pat. No. 11,024,458.

(51) Int. Cl.
*H01F 41/02* (2006.01)
*B05C 5/02* (2006.01)
(Continued)

(52) U.S. Cl.
CPC ......... *H01F 41/0253* (2013.01); *B05C 5/027* (2013.01); *B22F 9/08* (2013.01); *B22F 10/00* (2021.01); *B22F 10/62* (2021.01); *B22F 12/53* (2021.01); *B29C 64/106* (2017.08); *B29C 64/295* (2017.08); *H01F 1/12* (2013.01);
(Continued)

(58) Field of Classification Search
CPC ......... B05C 5/027; B22F 10/00; B22F 10/10; B22F 10/31; B22F 10/62; B22F 12/20; B22F 12/53; B22F 2009/0876; B22F 2009/088; B22F 3/115; B22F 9/08; B29C 64/106; B29C 64/209; B29C 64/295; B33Y 10/00; B33Y 30/00; C22C 2202/02; H01F 1/12; H01F 41/0206; H01F 41/0253; Y02P 10/25
USPC ....... 219/602, 609, 610, 614, 619, 622, 625, 219/649, 653, 654, 657, 658, 674, 216
See application file for complete search history.

(56) References Cited

U.S. PATENT DOCUMENTS

| | | | | |
|---|---|---|---|---|
| 2007/0122562 A1* | 5/2007 | Adams | ...................... | H05H 1/28 427/532 |
| 2012/0211126 A1* | 8/2012 | Zhang | ...................... | C21D 9/28 148/508 |
| 2013/0292081 A1* | 11/2013 | Hosek | .................. | B22F 3/1039 164/271 |

FOREIGN PATENT DOCUMENTS

| | | | | |
|---|---|---|---|---|
| CN | 105922583 A | * | 9/2016 | |
| KR | 2016136969 A | * | 11/2016 | ............... B22F 3/10 |

OTHER PUBLICATIONS

Translation of KR2016136969A, "3D Printer Having multiple induction heating head", Nov. 30, 2016, by ProQuest. (Year: 2016).*

* cited by examiner

*Primary Examiner* — Quang T Van
(74) *Attorney, Agent, or Firm* — Burris Law, PLLC

(57) ABSTRACT

A three-dimensional magnetic printer includes at least one induction head assembly including an induction heater to heat magnetic material to form an alloy melt and at least one nozzle operable to eject the alloy melt, a coating apparatus, and a base aligned with the at least one nozzle. The induction head assembly deposits at least one alloy melt layer and the
(Continued)

coating apparatus forms at least one insulating layer onto the base in accordance with a predetermined pattern to form a three-dimensional article.

20 Claims, 5 Drawing Sheets

(51) Int. Cl.
*B22F 9/08* (2006.01)
*B22F 10/00* (2021.01)
*B22F 10/62* (2021.01)
*B22F 12/53* (2021.01)
*B29C 64/106* (2017.01)
*B29C 64/295* (2017.01)
*H01F 1/12* (2006.01)
*B22F 3/115* (2006.01)
*B22F 10/10* (2021.01)
*B22F 10/31* (2021.01)
*B22F 12/20* (2021.01)
*B29C 64/209* (2017.01)
*B33Y 10/00* (2015.01)
*B33Y 30/00* (2015.01)

(52) U.S. Cl.
CPC .......... *H01F 41/0206* (2013.01); *B22F 3/115* (2013.01); *B22F 2009/0876* (2013.01); *B22F 2009/088* (2013.01); *B22F 10/10* (2021.01); *B22F 10/31* (2021.01); *B22F 12/20* (2021.01); *B29C 64/209* (2017.08); *B33Y 10/00* (2014.12); *B33Y 30/00* (2014.12); *C22C 2202/02* (2013.01)

METHOD FOR THREE-DIMENSIONAL PRINTING OF MAGNETIC MATERIALS

CROSS-REFERENCE TO RELATED APPLICATIONS

This application is a divisional application of U.S. Ser. No. 15/730,163, filed Oct. 11, 2017 and titled "METHOD FOR THREE-DIMENSIONAL PRINTING OF MAGNETIC MATERIALS," the contents of which are incorporated herein in their entirety.

FIELD

The present disclosure relates to three-dimensional (3D) printing technology, and more particularly, to a method and a printer for 3D printing of magnetic articles.

BACKGROUND

The statements in this section merely provide background information related to the present disclosure and may not constitute prior art.

Generally, magnetic materials, including permanent magnets and soft magnetic cores are manufactured in bulk by sintering, hot compaction, and bonding. These bulk magnetic materials are then cut, ground, or polished into final shapes for various applications, such as components for electric motors or electronic devices. Such process for producing magnetic articles can be time consuming, repetitive, and generate significant waste of material. The present disclosure addresses these and other issues related to forming magnetic articles.

SUMMARY

In one form of the present disclosure, a three-dimensional magnetic printer includes at least one induction head assembly including an induction heater to heat magnetic material to form an alloy melt and at least one nozzle operable to eject the alloy melt, a coating apparatus, and a base aligned with the at least one nozzle. The induction head assembly deposits at least one alloy melt layer and the coating apparatus forms at least one insulating layer onto the base in accordance with a predetermined pattern to form a three-dimensional article.

In some variations, the induction head assembly deposits a plurality of alloy melt layers and the coating apparatus forms at least one insulating layer between two of the plurality of alloy melt layers.

In at least one variation, the coating apparatus includes a sprayer.

In some variations, the insulating layer is at least one of an antiferromagnetic material, a diamagnetic material, an insulating material, a non-magnetic material, a paramagnetic material, a permanent magnetic material, and a soft magnetic material.

In at least one variation, the base has a fluid therein to cool the alloy melt.

In some variations, the three-dimensional magnetic printer includes one or more motors operable to move at least one of the at least one induction head assembly or the base. In such variations a controller configured to store a three-dimensional model of the article to be printed can be included and the controller can operate the motors to move the at least one induction head assembly and the base relative to each other based on the predetermined pattern, and operates the at least one nozzle to deposit the alloy melt onto the base.

In at least one variation, the three-dimensional magnetic printer includes a spray device having a spout and holding a fluid made of an insulating material, and the spray device is operable to apply the fluid onto a surface of the article formed by the alloy melt.

In some variations, the three-dimensional magnetic printer includes a plurality of the induction head assemblies and the induction head assemblies heat different materials to be ejected by the nozzles.

In at least one variation, the three-dimensional magnetic printer includes a powder forming device including a gas sprayer, wherein the powder forming device is operable to eject gas from the gas sprayer toward the alloy melt from the at least one nozzle to form a powder magnet as the three-dimensional article.

In some variations, the at least one induction head assembly is a plurality of induction head assemblies, and in such variations the plurality of induction head assemblies can heat and hold the same alloy material, or in the alternative, the plurality of induction head assemblies heat and hold different alloy materials.

In at least one variation the at least one induction head assembly comprises a plurality of nozzles.

And in some variations, the three-dimensional magnetic printer includes a 3D printer controller configured to at least one of adjust an opening defined by the nozzle control device, regulate flow of a pressurized gas into a vessel holding alloy melt, control movement of the induction head assembly, and adjust current to induction heater.

In another form of the present disclosure, a three-dimensional magnetic printer includes an induction head assembly with a vessel, an induction heater to heat magnetic material to form an alloy melt in the vessel and at least one nozzle with a nozzle control device operable to eject the alloy melt from the vessel, a coating apparatus with a sprayer, a base aligned with the at least one nozzle, and a 3D printer controller configured to at least one of adjust an opening defined by the nozzle control device, regulate flow of a pressurized gas into the vessel, control movement of the induction head assembly, and adjust current to induction heater. The induction head assembly deposits at least one alloy melt layer and the coating apparatus forms at least one insulating layer onto the base in accordance with a predetermined pattern to form a three-dimensional article.

In some variations, the induction head assembly deposits a plurality of alloy melt layers and the coating apparatus forms at least one insulating layer between two of the plurality of alloy melt layers. And in at least one variation, the at least one induction head assembly comprises a plurality of nozzles.

In still another form of the present disclosure, a three-dimensional magnetic printer includes a plurality of induction head assemblies, a coating apparatus with a sprayer, and a base. Each of the plurality of induction head assemblies comprises a vessel and an induction heater to heat magnetic material to form an alloy melt in the vessel and at least one nozzle with a nozzle control device operable to eject the alloy melt from the vessel and the base is aligned with at least one of the nozzles. The plurality of induction head assembly deposit a plurality of alloy melt layers and the coating apparatus forms at least one insulating layer onto the base in accordance with a predetermined pattern to form a three-dimensional article.

In some variations, the plurality of induction head assemblies deposit different alloy material layers onto the base.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
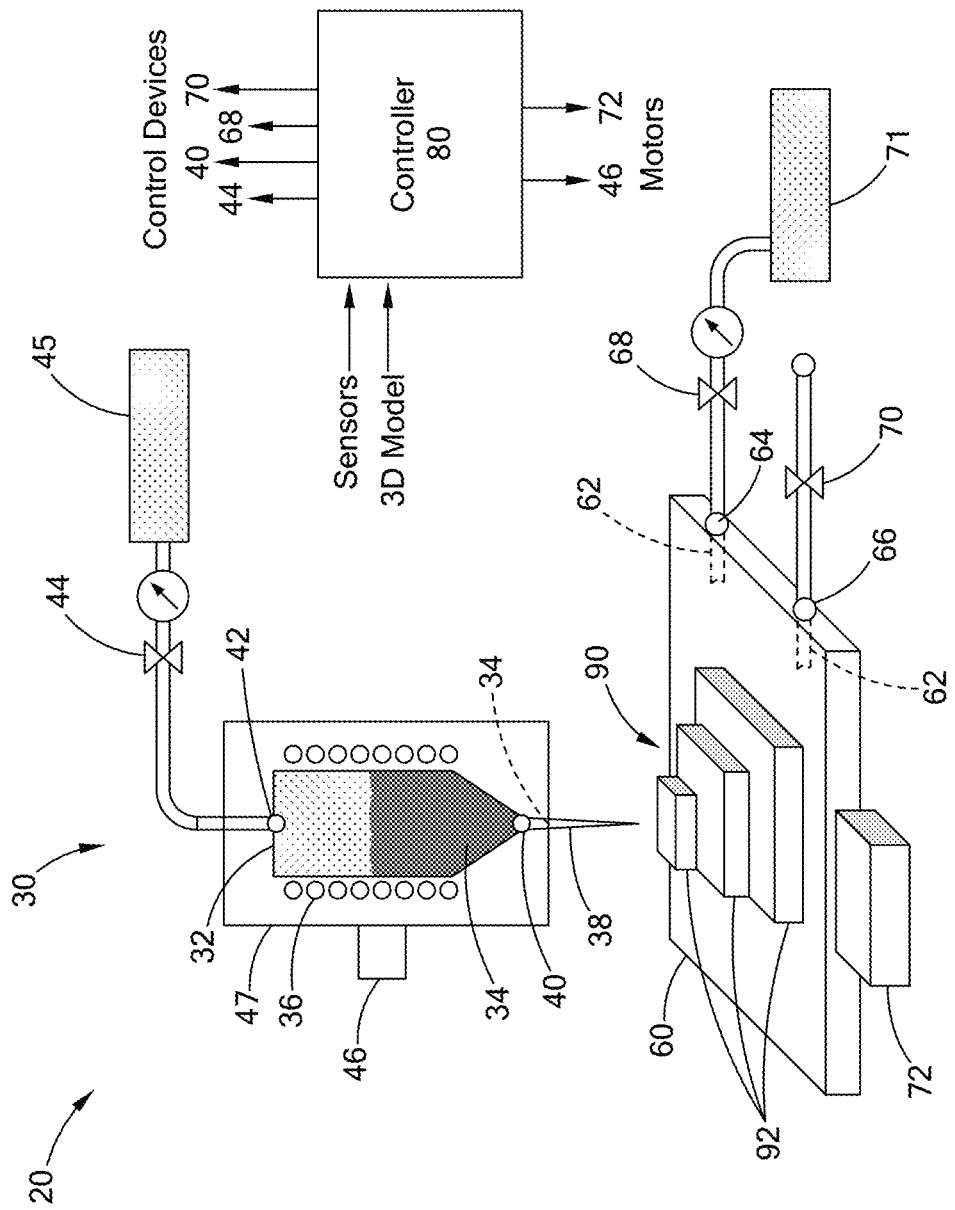
FIG. 1 illustrates an exemplary 3D magnetic printer according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present application discloses a 3D magnetic material printer for generating magnetic articles, such as precisely controlled magnetic devices, layered magnetic materials, and powder coated magnetic materials. In one form the 3D magnetic material printer is operable to produce, for example, permanent and soft magnet articles, and complicated shaped magnets and coated magnetic materials.

Referring to FIG. 1, an exemplary 3D magnetic printer 20 enabled to print various 3D magnetic articles according to the teachings of the present disclosure is provided. The 3D magnetic printer 20 comprises an induction head assembly 30, a base 60, and a 3D printer controller 80 (controller 80 hereafter).

In one form, the induction head assembly 30 is a high-frequency induction heater, and includes a vessel 32 for holding an alloy melt 34, an induction coil 36, a nozzle 38, a nozzle control device 40, a gas inlet 42, and a gas control device 44. In one form, the vessel 32 holds magnetic material, such as permanent magnetic material including, but not limited to, Nd—Fe—B, Nd—Fe—Al, Sm—Co—Fe, Al—Ni—Co, or soft magnetic material having a coercivity less than 1000 Am-1, which includes, but is not limited to, Fe, Fe—Co, Fe—B-base, Fe—Si-based, Fe—Cu—Nb—Si—B. Generally, the induction coil 36 is wrapped about the vessel 32 and receives a high-frequency alternating current (AC) from an electronic oscillator (not shown) to heat the material in the vessel 32 by electromagnetic induction. The temperature of the alloy melt 34 is controlled by, for example, adjusting the current applied to the coils 36.

The gas inlet 42 is connected to an upper portion of the vessel 32 and to a gas tank 45 by way of the gas control device 44. The gas control device 44 is operable to supply a pressurized gas stored in the gas tank 10 to the upper portion of the vessel 32 by way of the gas inlet 42. The pressurized gas displaces or in other words pushes the alloy melt 34 toward the nozzle 38. In one form, the gas control device 44 is a valve operable by the 3D printer controller 80.

The nozzle 38 is coupled to a lower portion of the vessel 32 by way of the nozzle control device 40. The nozzle control device 40 controls access to a passage between the vessel 32 and the nozzle 38 to have the alloy melt 34 flow from the vessel 32 through the nozzle 38, and onto the base 60. In one form, the nozzle control device 40 is a diaphragm or valve operable by the controller 80 to adjust an opening defined by the nozzle control device 40. The controller 80 is configured to control the flow of the alloy melt 34 through the nozzle 38 by regulating the flow of pressurized gas into the vessel 32 and by regulating the flow of alloy melt 34 through the nozzle control device 40 and the nozzle 38. In the following, the vessel 32, the induction coil 36, the nozzle 38, the nozzle control device 40, the gas inlet 42, and the gas control device 44 may be collectively referred to as the printer head of the printer.

In one form, the induction head assembly 30 includes an induction head motor 46 that is operable to move the induction head assembly 30 relative to the base 60. For example, the induction head assembly 30 may include a support member 47, such as a frame having one or more arms to support one or more components of the induction head assembly 30, such as the printer head. One or more induction head motors 46 are coupled to the support member 47 and configured to move the support member 47 along one or more axes. In one form, the induction head motor 46 is operable by the controller 80 to control the movement of the printer head of the induction head assembly 30.

The base 60 aligns with the nozzle 38 of the induction head assembly 30 to receive the alloy melt 34. The base 60 may be made of metals, ceramics, polymers, or combinations thereof. In one form, the base 60 is configured to cool the alloy melt 34 by way of a thermal media, such as water, gas, or coolant, flowing through the base 60. For example, the base 60 may define a base thermal media passageway 62 that receives the thermal media through a base inlet 64 and expels the thermal media through a base outlet 66. The passageway 62 extends within the base 60 in, for example, a serpentine manner. The thermal media flowing in the passageway 62 absorbs heat from the alloy melt 34 deposited on the base 60 to cool the alloy melt 34. The base 60 may incorporate cooling veins or other methods to control the temperature of the base 60.

In one form, a base thermal media control device 68 and a base thermal media exhaust control device 70 are positioned approximate to the base inlet 64 and the base outlet 66, respectively, to control the flow of the thermal media through the base 60. For example, the base thermal media control device 68 is operable to supply the thermal media stored in a thermal media tank 71 to the base thermal media passageway 62 by way of the base inlet 64, and the base thermal media exhaust control device 70 directs the hot thermal media exiting the base outlet 66 to, for example, a container or the environment depending on the thermal media. In one form, the base thermal media control device 68 and the base thermal media exhaust control device 70 are valves or a series of valves operable by the controller 80 to regulate the flow of the thermal media. It should be understood that the thermal media may be used to control the temperature of the base and not just to cool the base and still be within the scope of the present disclosure.

In addition to or in lieu of the induction head motors 46, in one form, the base 60 may include one or more base motors 72 that are operable to move the base 60 along one or more axes relative to the induction head assembly 30.

In one form, the controller 80 is a computer system that comprises, for example, a memory and at least one CPU, processor, or microprocessor. The controller 80 is configured to operate the induction head assembly 30 and the base 60 to generate a magnetic article, such as a layered magnetic article 90 illustrated in FIG. 1. With respect to the induction head assembly 30, the controller 80 is configured to control the temperature of the alloy melt, and operate the gas control device 44 and the nozzle control device 40 to dispense the alloy melt 34 from the vessel 32 and onto the base 60. For example, a temperature sensor (not shown) may be positioned with the induction head assembly 30 to detect the temperature of the alloy melt. Using the temperature, the controller 80 can adjust the current applied to coils 36 to control the temperature of the alloy melt 34.

The controller 80 is further configured to operate the base thermal media control device 68 and the base thermal media exhaust control device 70 to control the thermal operation of the base 60 on the alloy melt. In one form, the controller 80 includes predetermined data that correlates ejection rates of the alloy melt and thermal exchange rates of the base 60 to achieve desired material properties with appropriate material structures.

Generally, the 3D article is formed using a 3D model that is deconstructed into one or more patterns or layers that together form the 3D article. For example, the three-layer article 90 is generated by at least three layers 92, where each layer 92 is formed by moving the induction head assembly 30 and the base 60 relative to each other and tracing a pattern representative of the layer onto the base 60. Here, the controller 80 is configured to deconstruct the 3D model and control the movement of the induction heater assembly 30 and the base 60 to trace the pattern onto the base 60.

The controller 80 is configured in various suitable ways to control and operate the components of the printer 20 to form the 3D magnetic article within specific tolerances and material properties. Specifically, in one form, the controller 80 is configured to: monitor and control the temperatures of the alloy melt, the thermal media, and/or the base 60 to control the material properties of the 3D article; control the flow rate of the alloy melt by adjusting the gas pressure applied to the vessel 32; control the cooling rate of the article by adjusting the flow of thermal media in the base; and accurately aligning the induction head assembly 30 and the base 60 to form the pattern on the base 60.

The 3D printer is operable to generate magnets with sophisticated geometric form, which can yield desired magnetic flux lines based on and tailored to each application. Such near-net-shape approach saves critical materials, time, and cost. In one form of the present disclosure, the desired magnetic flux is controlled by exposing the 3D magnetic article to a designed external magnetic field.

FIG. 1 depicts the printing of a multilayered 3D magnetic article 90. However, it should be understood that the article could be any shape, form, or alloy composition such as a single-layered magnet, an article in the shape of a trademark, a conformable antenna, or various other patterns, and still be within the teachings of the present disclosure. It should also be understood that the manufacture of 3D permanent magnetics and 3D soft magnetic cores may be made by the teaching of the present disclosure.

While the printer 20 is illustrated as having a pressurized gas based induction head assembly 30 for ejecting the alloy melt from the vessel 32, other suitable ejection methods may be used. For example, with the printer 20 or base 60 sealed in a chamber and the pressure in the chamber being below the pressure in the vessel 32, the pressure differential between the chamber and the vessel causes the alloy melt to eject from the nozzle with the nozzle control device being in an open position. Additionally, the weight of the alloy melt, an open nozzle control device, and gravity may also be used to eject and/or control flow of the alloy melt out of the vessel 32.

Figure 2:
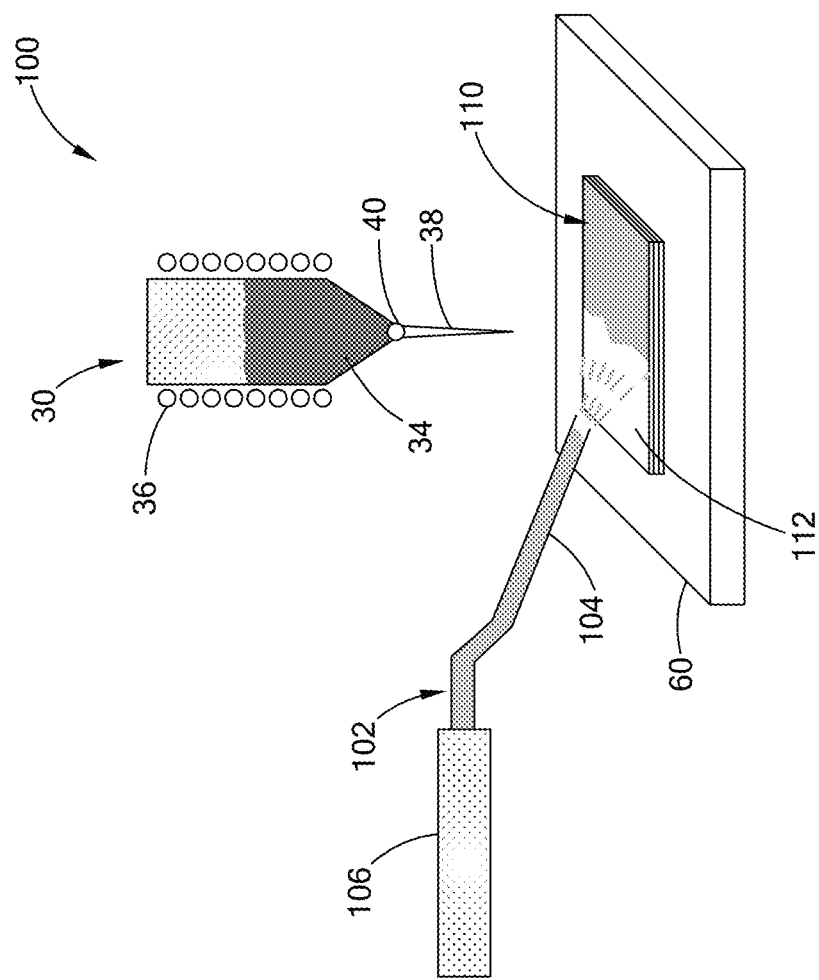
FIG. 2 illustrates an exemplary 3D magnetic printer having a coating apparatus according to the teachings of the present disclosure.

In another form, the present disclosure is directed toward a 3D magnetic printer that includes a coating apparatus for forming an insulating layer on a surface of the pattern formed on the base. For example, FIG. 2 illustrates a 3D magnetic printer 100 that includes a coating apparatus 102 having a sprayer 104 and a media tank 106 holding an insulating media (e.g., gas, liquid, powder) and being coupled to the sprayer 104. The printer 100 also includes one or more of the components of the 3D magnetic printer 20 of FIG. 1, some of which are shown in FIG. 2. The coating apparatus 102 is operable by, for example, the controller 80 to form an insulating layer 110 on a pattern 112 traced by the induction head assembly 30. One example of the layered materials could be iron-silicon compounds (Fe—Si) where the coating is an electrically insulating material, similar to electrical steel laminations. However, the 3D magnetic printer 100 is enabled to deposit a range of compositions including but not limited to up to 7 wt. % Si, and both amorphous, crystalline, and nanocrystalline compositions with >7 wt. % Si contents. Furthermore, the insulating layer maybe an oxide layer formed by applying or ejecting oxygen toward the pattern 112.

The controller 80 is configured to control the coating apparatus 102 in various suitable ways. For example, the controller 80 may form the insulating layer after each pattern is traced, such that, for a multi-layer structures, the insulating, magnetic, or non-magnetic layer is provided between each layer.

Figure 3:
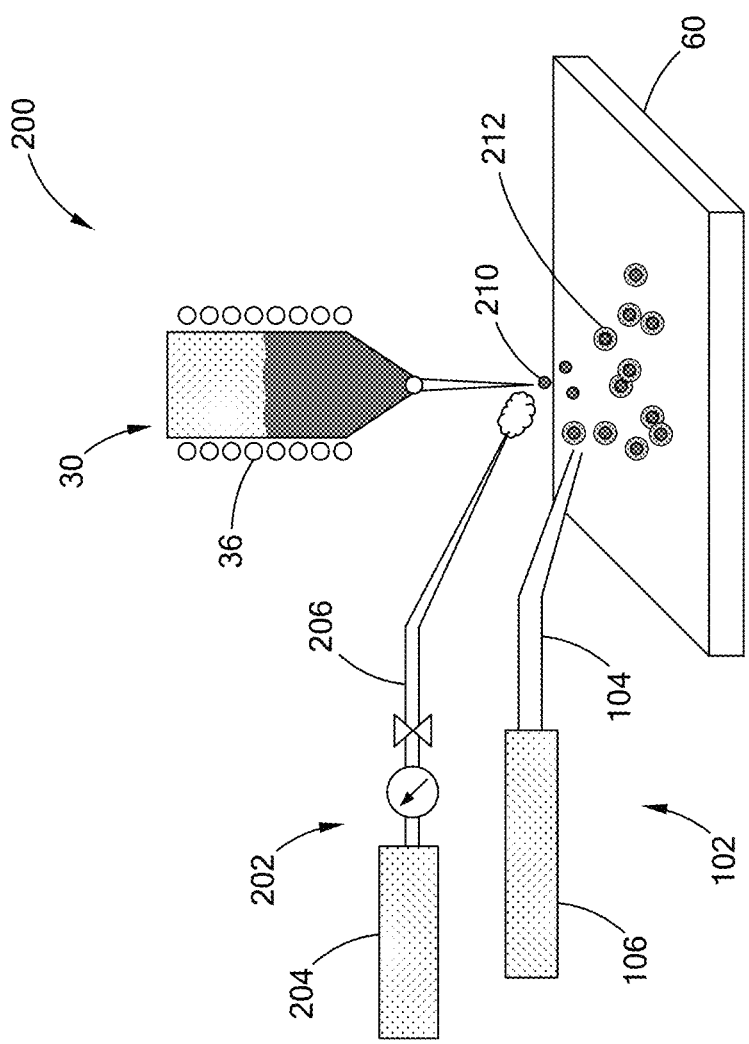
FIG. 3 illustrates an exemplary 3D magnetic printer having a powder forming device to print form powder magnetic material according to the teachings of the present disclosure.

In yet another form, referring to FIG. 3, a 3D printer 200 is configured to generate powder magnetic materials, and includes a powder forming device 202 having a gas tank 204 and a gas sprayer 206 coupled to the gas tank 204. The printer 200 further includes the coating apparatus 102 and one or more of the components of the 3D magnetic printer 20. The controller 80 operates the gas sprayer 206 to eject or blow gas toward the alloy melt being ejected from the nozzle 38 to produce magnetic powders 210. The gas could be an inert or relatively inert gas such as argon, nitrogen, or another gas which does not have an undesired chemical reaction with the 3D magnetic article. The magnetic powder 210 is cooled by the ejected gas before coating. The magnetic powder 210 is then further cooled by the base 60. The controller 80 may also form a coating on the powder by applying the media in tank 106 to the powder 210 to form a coated powder 212. For example, the coating may be an insulating layer similar to that described with regard to FIG. 2.

The 3D printer 200 is operable to generate amorphous grains, single crystalline grains, polycrystalline grains, or combinations thereof in different sizes. For example, in one form, the controller 80 is configured to control the size of the powder by adjusting, for example, the rate at which the alloy melt is being dispensed, the pressure of the gas ejected from the powder forming device 202, the temperature of the alloy melt, and/or the cooling rate of the base 60.

While specific components of the printer 20 are illustrated in FIGS. 2 and 3, it should be understood that printers 100 and 200 may include additional components of printer 20 and should not be limited to components depicted.

Figure 4:
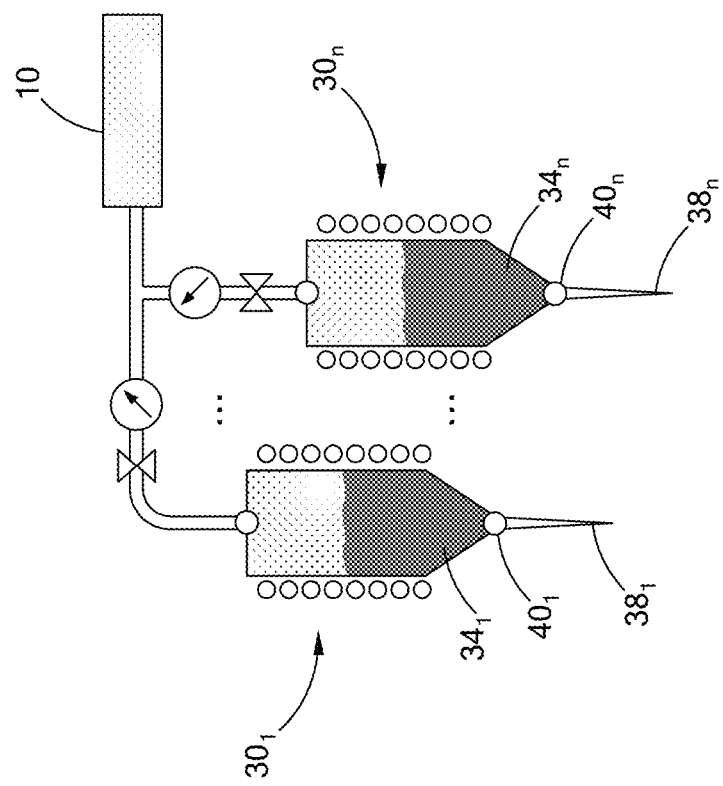
FIG. 4 illustrates a portion of a 3D magnetic printer with multiple induction head assemblies according to the teachings of the present disclosure.

The 3D magnetic printers 20, 100, and/or 200 are illustrated as having one induction head assembly 30. However, in one form, the printers 20, 100, 200 may include a plurality of induction head assemblies 301 to 30n, as illustrated in FIG. 4. The different induction head assemblies hold different or the same alloy material to form one or more 3D magnetic articles. For example, different materials with different properties can be printed into a single magnet with a smooth transition (i.e., a gradient) between properties, such that at the surface of magnets, a higher dysprosium (Dy) content can be used to reduce corner, edge, or surface demagnetization during machine operation. In another example, the induction head assemblies can be configured to hold magnetic and non-magnetic material to print three-dimensional articles.

Figure 5:
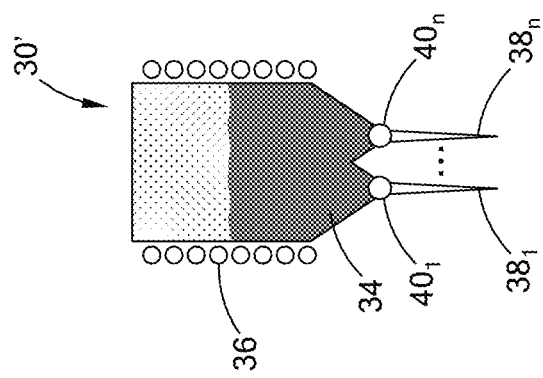
FIG. 5 illustrates a portion of a 3D magnetic printer having an induction head assembly with multiple nozzles according to the teachings of the present disclosure.

Referring to FIG. 5, in yet another form, the printers 20, 100, and/or 200 include a plurality of nozzles 381 to 38n with a plurality of nozzle control devices 401 to 40n attached to the vessel 32. The different nozzles 381 to 38n and control devices 401 to 40n are operable to produce, for example, a 3D magnet with different structures, such as multiple layered materials, or multiple 3D magnetic articles at the same time.

Figure 6:
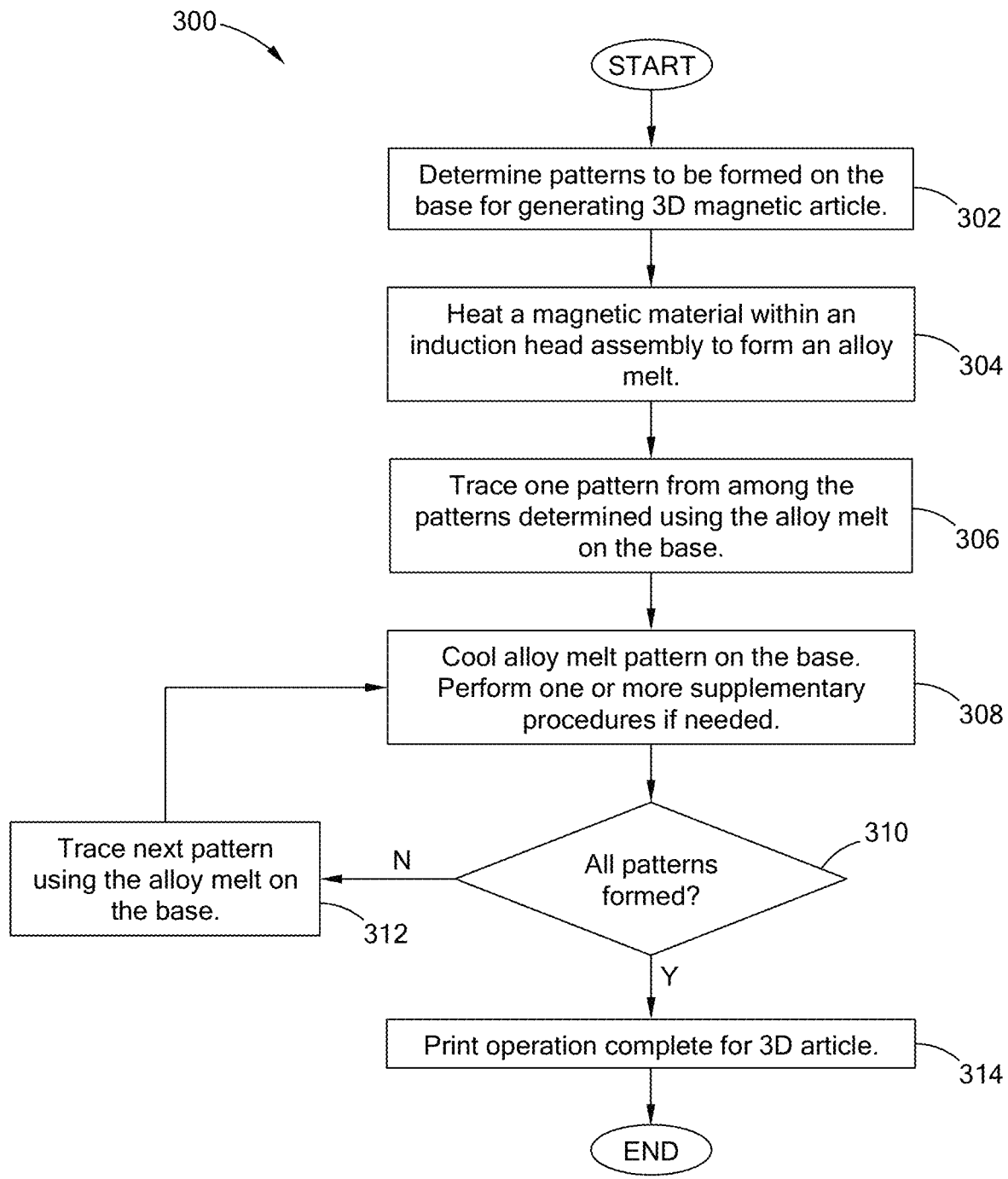
FIG. 6 is a flow chart of a method for printing three-dimensional magnetic articles according to the teachings of the present disclosure.

Referring to FIG. 6, an example print routine 300 for printing a 3D magnetic article executed by the 3D magnetic printer of the present disclosure is provided. At block 302, the controller determines the patterns to be traced to form the article. For example, the controller is configured to deconstruct a 3D model of the article using pre-stored programs and user inputs to determine the patterns desired to form the magnetic article having specific material properties. At block 304, the controller operates the induction head assembly to heat the material in the vessel to form an alloy melt, and in block 306, the controller traces one pattern, from among the patterns determined, on the base using the alloy melt. In one form, the controller moves the base and the induction head assembly relative to each other by operating one or more motors of the printer. The controller further operates the gas control device and the nozzle control device to deposit the alloy melt onto the base to form the pattern.

At block 308, the controller cools the alloy melt pattern on the base. Here, the controller may control the thermal medium flowing in the base to transfer heat from the pattern. In one form, the controller also monitors the temperature of the pattern to determine if the next pattern should be traced. For example, the controller receives data from a sensor (e.g., infrared camera) that indicates the temperature of the alloy melt pattern. Based on such data, the controller may perform the next trace operation. At block 308, the controller may also perform a supplementary procedure, such as forming an insulation layer on the pattern.

At block 310, the controller determines if all the patterns have been formed. If patterns still remain, the controller traces the next pattern on the base using the alloy melt, at block 312, and continues to block 308. If all the patterns have been formed, the controller determines that the print operation for the 3D article is complete, at block 314. Once complete, the 3D article may undergo additional procedures, such as being exposed to an external magnetic field for alignment, and a heat treatment process to improve properties of the material.

The routine for forming the 3D magnetic article may include additional steps or may exclude one or more steps of FIG. 6. For example, in one form, the printer may include powder forming device and the routine may include ejecting gas toward the alloy melt from the nozzle to form the powder magnetic material.

The 3D magnetic material printer of the present disclosure enables and improves the production of magnets with sophisticated geometric forms, which can create improved magnetic flux lines based on the desired application. Furthermore, the 3D magnetic material printer enables and improves the production of near-net-shape magnetic articles, thus reducing scrap, waste, and cost associated with magnet device manufacture. The magnetic articles produced with 3D magnetic material printing technology may desire further additional treatments after printing: e.g. external magnetic fields for alignment, heat treatments to improve properties, etc.

Based on the foregoing, in one form of the present disclosure, a method for printing a three-dimensional article is provided. The method comprises induction heating, by an induction head assembly, a magnetic material to form an alloy melt. The induction head assembly includes a nozzle and an induction heater that heats the magnetic material. The induction head assembly ejects the alloy melt from the nozzle onto a base and traces a predetermined pattern on the base with the alloy melt to form a three-dimensional article.

In one form, the tracing of the predetermined pattern comprises moving the induction head assembly and the base relative to each other based on the predetermined pattern.

In another form, the method further comprises the base cooling the alloy melt traced on the base.

In yet another form, the ejecting the alloy melt from the nozzle further comprises applying a gaseous pressure on the alloy melt in the induction heater to eject the alloy melt from the nozzle.

In one form, the tracing of the predetermined pattern further comprises layering two or more traces of the alloy melt.

In another form, the tracing of the predetermined pattern further comprises applying an insulating coat between the layers of the two or more traces.

In another form, the magnetic material is a permanent magnetic material.

In a form of the present disclosure, the magnetic material is at least one of a paramagnetic, a diamagnetic, and an antiferromagnetic material.

In yet another form of the present disclosure, the magnetic material is a soft magnetic material.

In yet another form, the magnetic material is a soft magnetic material having a coercivity less than 1000 Am-1.

In one form, an insulating coat is formed on a surface of the three-dimensional article.

In another form of the present disclosure, the three-dimensional article is exposed to an external magnetic field.

In a form of the present disclosure, an apparatus for printing a three-dimensional article is provided. The apparatus, a three-dimensional magnetic printer, comprises an induction head assembly and a base. The induction head assembly includes an induction heater to heat magnetic material to form an alloy melt and a nozzle operable to eject the alloy melt. The base is aligned with the nozzle, and the induction head assembly deposits the alloy melt onto the base in accordance with a predetermined pattern that forms a three-dimensional article.

In one form, the base contains a fluid or media to cool the alloy melt.

In another form, the three-dimensional magnetic printer further comprises one or more motors operable to move at least one of the induction head assembly or the base.

In yet another form, the three-dimensional magnetic printer further a controller capable of storing a three-dimensional model of the article to be printed. The controller operates the motors to move the induction head assembly and the base relative to each other based on the predetermined pattern, and the controller operates the nozzle to deposit the alloy melt onto the base.

In one form, the three-dimensional magnetic printer further comprises a spray device having a spout and holding a fluid made of an insulating material. The spray device is operable to apply the fluid onto a surface of the article formed by the alloy melt.

In another form, the three-dimensional magnetic printer further comprises a plurality of the induction head assemblies. The induction head assemblies heat different materials to be ejected by their respective nozzles.

In yet another form, the three-dimensional magnetic printer further comprises a powder forming device including a gas sprayer. The powder forming device is operable to eject gas from the gas sprayer toward the alloy melt from the nozzle to form a powder magnet as the three-dimensional article.

In one form of the present disclosure, another method for printing a three-dimensional article is provided. The method includes induction heating, by an induction head assembly, a magnetic material to form an alloy melt. The method selectively moves the induction head assembly and a base relative to each other based on a predetermined pattern used to form the three-dimensional article. The method deposits, by the induction head assembly, the alloy melt onto the base in accordance with the configuration of the predetermined pattern, thus forming the three-dimensional magnetic article.

In another form, the method further comprises cooling the alloy melt as the melt is being deposited on the base.

In another form of the present disclosure, the base has media therein to cool the alloy melt.

In a form of the present disclosure, the 3D magnetic printer further comprises a controller storing a three-dimensional model of the article to be printed, wherein the controller operates motors to move the induction head assembly and the base relative to each other based on the predetermined pattern, and operates the nozzle to deposit the alloy melt onto the base.

In another form of the present disclosure, the 3D magnetic printer further comprises a spray device having a spout and holding a media made of an insulating material. The spray device is operable to apply the media onto a surface of the three-dimensional article formed by the alloy melt.

In one form of the present disclosure, different magnetic and non-magnetic materials (e.g., permanent magnetic, soft magnetic, paramagnetic, diamagnetic, antiferromagnetic, and/or insulating materials) are layered upon each other. For example, Nd—Fe—B based materials could be layered with a heavy-rare-earth (HRE) based alloy, or a rare-earth transition metal (RE-TM) alloy. In another form, a post heat treatment is applied to diffuse the HRE element in the HRE-layer into the Nd—Fe—B based material to enhance the coercivity of the permanent magnets.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A three-dimensional magnetic printer comprising:
   at least one induction head assembly including an induction heater to heat magnetic material to form an alloy melt and at least one nozzle operable to eject the alloy melt;
   a coating apparatus;
   a base aligned with the at least one nozzle; and
   a 3D printer controller configured to at least one of adjust an opening defined by a nozzle control device, regulate flow of a pressurized gas into a vessel holding alloy melt, control movement of the induction head assembly, and adjust current to induction heater,
   wherein the induction head assembly deposits at least one alloy melt layer and the coating apparatus forms at least one insulating layer onto the base in accordance with a predetermined pattern to form a three-dimensional article.

2. The three-dimensional magnetic printer of claim 1, wherein the induction head assembly deposits a plurality of alloy melt layers and the coating apparatus forms at least one insulating layer between two of the plurality of alloy melt layers.

3. The three-dimensional magnetic printer of claim 1, wherein the coating apparatus comprises a sprayer.

4. The three-dimensional magnetic printer of claim 1, wherein the insulating layer is at least one of an antiferromagnetic material, a diamagnetic material, an insulating material, a non-magnetic material, a paramagnetic material, a permanent magnetic material, and a soft magnetic material.

5. The three-dimensional magnetic printer of claim 1, wherein the base has a fluid therein to cool the alloy melt.

6. The three-dimensional magnetic printer of claim 1 further comprising one or more motors operable to move at least one of the at least one induction head assembly or the base.

7. The three-dimensional magnetic printer of claim 6 further comprising a controller configured to store storing a three-dimensional model of the three-dimensional article to be printed, wherein the controller operates the motors to move the at least one induction head assembly and the base relative to each other based on the predetermined pattern, and operates the at least one nozzle to deposit the alloy melt onto the base.

8. The three-dimensional magnetic printer of claim 1 further comprising a spray device having a spout and holding a fluid made of an insulating material, and the spray device is operable to apply the fluid onto a surface of the three-dimensional article formed by the alloy melt.

9. The three-dimensional magnetic printer of claim 1 further comprising a plurality of the induction head assemblies, wherein the plurality of induction head assemblies heat different materials to be ejected by the nozzles.

10. The three-dimensional magnetic printer of claim 1 further comprising a powder forming device including a gas sprayer, wherein the powder forming device is operable to eject gas from the gas sprayer toward the alloy melt from the at least one nozzle to form a powder magnet as the three-dimensional article.

11. The three-dimensional magnetic printer of claim 1, wherein the at least one induction head assembly comprises a plurality of induction head assemblies.

12. The three-dimensional magnetic printer of claim 11, wherein the plurality of induction head assemblies heat and hold the same alloy material.

13. The three-dimensional magnetic printer of claim 11, wherein the plurality of induction head assemblies heat and hold different alloy materials.

14. The three-dimensional magnetic printer of claim 1, wherein the at least one induction head assembly comprises a plurality of nozzles.

15. A three-dimensional magnetic printer comprising:
an induction head assembly including a vessel, an induction heater to heat magnetic material to form an alloy melt in the vessel and at least one nozzle with a nozzle control device operable to eject the alloy melt from the vessel;
a coating apparatus comprising a sprayer;
a base aligned with the at least one nozzle; and
a 3D printer controller configured to at least one of adjust an opening defined by the nozzle control device, regulate flow of a pressurized gas into the vessel, control movement of the induction head assembly, and adjust current to induction heater,
wherein the induction head assembly deposits at least one alloy melt layer and the coating apparatus forms at least one insulating layer onto the base in accordance with a predetermined pattern to form a three-dimensional article.

16. The three-dimensional magnetic printer of claim 15, wherein the induction head assembly deposits a plurality of alloy melt layers and the coating apparatus forms at least one insulating layer between two of the plurality of alloy melt layers.

17. The three-dimensional magnetic printer of claim 16, wherein the induction head assembly comprises a plurality of nozzles.

18. The three-dimensional magnetic printer of claim 15 further comprising a powder forming device including a gas sprayer, wherein the powder forming device is operable to eject gas from the gas sprayer toward the alloy melt from the at least one nozzle to form a powder magnet as the three-dimensional article.

19. A three-dimensional magnetic printer comprising:
a plurality of induction head assemblies, wherein each of the plurality of induction head assemblies comprises a vessel and an induction heater to heat magnetic material to form an alloy melt in the vessel and at least one nozzle with a nozzle control device operable to eject the alloy melt from the vessel;
a coating apparatus comprising a sprayer; and
a base aligned with the at least one of the nozzles,
wherein the plurality of induction head assemblies deposit a plurality of alloy melt layers and the coating apparatus forms at least one insulating layer onto the base in accordance with a predetermined pattern to form a three-dimensional article,
wherein the plurality of induction head assemblies deposit different alloy material layers onto the base.

20. The three-dimensional magnetic printer of claim 19, further comprising a 3D printer controller configured to at least one of adjust an opening defined by a nozzle control device, regulate flow of a pressurized gas into a vessel holding alloy melt, control movement of the induction head assembly, and adjust current to induction heater.

* * * * *